United States Patent
Burk (10) Patent No.: US 10,323,864 B2
(45) Date of Patent: Jun. 18, 2019

(54) ADSORPTION HEAT PUMP (71) Applicant: Mahle International GmbH, Stuttgart (DE)

(72) Inventor: Roland Burk, Stuttgart (DE)

(73) Assignee: Mahle International GmbH (DE)

(*) Notice: Subject to any disclaimer, the term of this patent is extended or adjusted under 35 U.S.C. 154(b) by 0 days.

(21) Appl. No.: 15/565,146

(22) PCT Filed: Mar. 31, 2016

(86) PCT No.: PCT/EP2016/057057
§ 371 (c)(1),
(2) Date: Oct. 6, 2017

(87) PCT Pub. No.: WO2016/162257
PCT Pub. Date: Oct. 13, 2016

(65) Prior Publication Data
US 2018/0073783 A1 Mar. 15, 2018

(30) Foreign Application Priority Data
Apr. 8, 2015 (DE) .................. 10 2015 206 271

(51) Int. Cl.
*F25B 17/08* (2006.01)
*F25B 41/04* (2006.01)
*F25B 30/04* (2006.01)

(52) U.S. Cl.
CPC .............. *F25B 17/08* (2013.01); *F25B 41/04* (2013.01); *F25B 30/04* (2013.01); *Y02A 30/276* (2018.01);
(Continued)

(58) Field of Classification Search
CPC .......... F25B 17/08; F25B 41/04; F25B 30/04; Y02A 30/278; Y02B 30/64
See application file for complete search history.

(56) References Cited

U.S. PATENT DOCUMENTS

| 8,539,782 B2 | 9/2013 | Buttner et al. |
| 9,618,243 B2 | 4/2017 | Burk et al. |

(Continued)

FOREIGN PATENT DOCUMENTS

| DE | 3518738 A1 | 11/1986 |
| DE | 10335831 A1 | 3/2005 |

(Continued)

OTHER PUBLICATIONS

English abstract for DE-3518738.
(Continued)

*Primary Examiner* — Ana M Vazquez
(74) *Attorney, Agent, or Firm* — Fishman Stewart PLLC (57) ABSTRACT

An adsorption heat pump may include a high temperature circuit for a high temperature heat transfer medium, a medium temperature circuit for a medium temperature heat transfer medium, and at least one sorption module in operative communication with the high temperature circuit and the medium temperature circuit. The at least one sorption module may include a sorption zone, a phase change zone, a working medium, a sorbent which may absorb and desorb the working medium, a first flow channel thermally contacting the sorbent, and a second flow channel thermally contacting the phase change zone. A first valve and a second valve may be in operative communication with the sorption module, the high temperature circuit, and the medium temperature circuit. The first valve and second valve may be configured to move between a closed position, a first open position, a second open position, and at least one intermediate position.

20 Claims, 5 Drawing Sheets

(52) U.S. Cl.
CPC ........... *Y02A 30/277* (2018.01); *Y02A 30/278* (2018.01); *Y02B 30/62* (2013.01); *Y02B 30/64* (2013.01)

(56) References Cited

U.S. PATENT DOCUMENTS

| | | |
|---|---|---|
| 2004/0007011 A1 | 1/2004 | Tanaka |
| 2011/0167842 A1 | 7/2011 | Paulussen |
| 2014/0298832 A1 | 10/2014 | Sommer et al. |

FOREIGN PATENT DOCUMENTS

| | | |
|---|---|---|
| DE | 102006011409 A1 | 6/2007 |
| DE | 102007061551 A1 | 7/2009 |
| DE | 102009036545 A1 | 2/2011 |
| DE | 102011003664 A1 | 8/2012 |
| DE | 102011102036 A1 | 11/2012 |
| DE | 102014211703 A1 | 12/2014 |
| EP | 1970650 A2 | 9/2008 |
| WO | WO-2010078957 A2 | 7/2010 |
| WO | WO-2012156481 A2 | 11/2012 |

OTHER PUBLICATIONS

English abstract for DE-10335831.
English abstract for DE-102009036545.
English abstract for DE-102011003664.
English abstract for EP-1970650.

ADSORPTION HEAT PUMP

CROSS-REFERENCE TO RELATED APPLICATIONS

This application claims priority to International Patent Application No.: PCT/EP2016/057057 filed on Mar. 31, 2016, and German Patent Application No.: DE 10 2015 206 271.6 filed on Apr. 8, 2015, the contents of which are incorporated herein by reference in their entirety.

TECHNICAL FIELD

The invention relates to an adsorption heat pump comprising a high temperature circuit for a high temperature heat transfer medium, which comprises a high temperature flow pipe and a high temperature return pipe.

BACKGROUND

On principle, heat pumps are operated with a fluid, which evaporates at low pressure when heat is supplied and which condensates again after the compression at a higher pressure when heat is supplied. Heat can thus be transferred from the evaporation zone to the condensation zone by means of mechanical work in the form of the pressure changes. In the case of adsorption heat pumps, the pressure differences are reached in that an adsorbent adsorbs the fluid at a lower pressure and desorbs it at a higher pressure. In response to the desorption, heat is supplied to the adsorbent at a high temperature level and in response to the adsorption, heat is removed from the adsorbent at a low temperature level. The pressure differences required for the heat pump can thus be reached by heating and cooling the adsorbent. No mechanical energy, but thermal energy is thus used, in order to operate the heat pump. This process cannot be carried out continuously, because the adsorbent is usually a solid, which must remain in place. This is why adsorption heat pumps are operated discontinuously and cyclically change between adsorption and desorption.

The temperature of the sorption zone is thereby alternately controlled by means of a high temperature heat transfer medium and by means of a medium temperature heat transfer medium, so that the desorbent changes between adsorption and desorption in the sorption zone. For switching between adsorption and desorption, it is known from the prior art to use rotary valves. Such rotary valves are known for example from DE 10 2009 036 545 A1 and from DE 10 2014 211 703 A1. Such rotary valves have the disadvantage that a scaling of the adsorption heat pump is not possible, because the rotary valves are designed for a fixed number of sorption modules.

An adsorption heat pump is known from DE 10 2011 003 664 A1, which has independent valves, in order to switch between the high temperature heat transfer medium and the medium temperature heat transfer medium. In the case of this embodiment, the option of recovering heat, which was expended in response to heating the sorption zone, is very limited.

SUMMARY

The invention at hand is based on the object of improving the flexibility and the efficiency of an adsorption heat pump.

According to this invention, this object is solved by means of the independent claims. Advantageous further developments are the subject matter of the dependent claims.

The invention is based on the general idea of using valves for the circuitry of the sorption modules, which provide for a control of the sorption modules, which is as flexible and energy-efficient as possible. It is advantageous that a first valve connects the high temperature flow pipe and the medium temperature flow pipe to the first flow channel, that a second valve connects the high temperature return pipe and the medium temperature return pipe to the first flow channel, that the valves have a first port, a second port and a third port, wherein a fluidically effective connection between the first and the third port and a fluidically effective connection between the second and the third port can be controlled in each case, that the valves have a closed position, in which both connections are closed, that the valves have a first open position, in which a first connection is open and a second connection is closed, that the valves have a second open position, in which the second connection is open and the first connection is closed, that the valves have at least one intermediate position, in which the first or the second connection is partially open and the respective other connection is closed. The sorption zone can thus not only be switched back and forth between two temperature levels, by changing between the high temperature circuit and the medium temperature circuit, but heat can be recovered from the sorption modules, for example in a cross circuit by means of the intermediate positions, in which only a throttled flow is possible, or, in other words, a harmful diversion of heat from the circuit of a higher temperature to the circuit of a lower temperature can be minimized. The efficiency of the adsorption heat pump can thus be improved.

An advantageous option provides for the valves to be embodied in such a way that the valves are able to maintain the closed position, the open positions and the at least one intermediate position without power. No energy is used in this way when the valves remain in a certain position, so that the efficiency of the adsorption heat pump as a whole can be improved.

In the description and the enclosed claims, "without power" is understood in such a way that no power needs to be supplied. This means that the valves do not use any energy during that time. This can be achieved, for example, by using self-locking gears or step motors.

A particularly advantageous option provides for the adsorption heat pump to have a low temperature circuit for a low temperature heat transfer medium comprising a low temperature flow pipe and a low temperature return pipe. Heat absorbed in an evaporating phase in the phase change zone can thus be used in order to cool the low temperature heat transfer medium. The low temperature heat transfer medium can be used to cool a room or a product.

A favorable solution provides for the adsorption heat pump to have at least four valves, which can be controlled and/or regulated independently from one another, wherein a third valve alternatively connects the low temperature flow pipe or the medium temperature flow pipe to the second flow channel, and wherein a fourth valve connects the low temperature return pipe or the medium temperature return pipe to the second flow channel. The flow of the phase change zone can thus also be controlled in a highly flexible manner, so that heat can also be recovered from the phase change zone.

A particularly favorable solution provides for the adsorption heat pump to be embodied in such a way that the connection between the high temperature flow pipe and the first flow channel and the connection between the first flow channel and the high temperature return pipe are open in a desorption phase of the sorption module, and for the adsorption heat pump to be embodied in such a way that the connection between the medium temperature flow pipe and the first flow channel and the connection between the first flow channel and the medium temperature return pipe are open in an adsorption phase of the sorption module, and for the adsorption heat pump to be embodied in such a way that the connection between the medium temperature flow pipe and the first flow channel is partially or completely open and the connection between the first flow channel to the high temperature return pipe is partially or completely open at least temporarily in response to a change from the desorption phase to the adsorption phase, wherein one of the connections is only partially open. In response to a change from the desorption phase to the adsorption phase, the sorption modules are cooled down from the high temperature during the desorption phase to the medium temperature during the adsorption phase. The flow through the first flow channel is throttled by only partially opening the connection, so that the heat transfer medium, which flows through the first flow channel, has at least approximately the temperature of the sorption module when escaping from the sorption module. If the flow speed through the sorption module is sufficiently small, a temperature gradient forms in the sorption module, wherein the temperature of the sorption module is still at the temperature of the high temperature circuit virtually until the complete change of the temperature at the outlet of the first flow channel. The temperature gradient shifts slowly from the inlet side to the outlet side, until the sorption zone has completely adopted the temperature of the medium temperature heat transfer medium. As long as the outlet area of the first flow channel still has the temperature of the high temperature heat transfer medium, the heat transfer medium, which flows through the first flow channel, is heated to the temperature of the high temperature heat source. The medium temperature heat transfer medium, which cools down the sorption module, can thus absorb a very high percentage of the thermal energy from the sorption module. This is returned to the high temperature circuit, so that this heat can be used further. If the heat transfer medium were to be returned to the medium temperature return pipe, the heat would be lost and would need to be released into the environment, which would additionally burden the recooling system. By minimizing this effect, the energy expenditure for carrying out the temperature change in the sorption zone is significantly reduced. This, in turn, increases the efficiency of the adsorption heat pumps.

An advantageous alternative provides for the adsorption heat pump to be embodied in such a way that the connection between the high temperature flow pipe and the first flow channel is partially or completely open and the connection between the first flow channel to the medium temperature return pipe is partially or completely open at least temporarily in response to a change from the adsorption phase to the desorption phase, wherein one of the two connections is only partially open. According to the change between the desorption phase to the adsorption phase, the required amount of energy, which must be exerted in order to heat the sorption zone, can be reduced in this way. The high temperature heat transfer medium, which is guided in the first flow channel in a throttled manner in order to heat the sorption zone, adopts the temperature of the sorption zone virtually completely in response to a sufficiently low flow speed. A temperature gradient, which shifts slowly from the inlet side to the outlet side until the sorption zone has completely adopted the temperature of the high temperature heat transfer medium, is thus created in the sorption zone. As long as the outlet area of the first flow channel still has the temperature of the medium temperature heat transfer medium, the heat transfer medium, which flows through the first flow channel, is cooled down to the temperature of the medium temperature heat sink. No cold heat transfer medium is thus supplied to the high temperature circuit through the cross circuit in response to heating up the sorption zone, so that said high temperature circuit does not cool down. It goes without saying that thermal energy is removed from the high temperature circuit, because the volume of the high temperature carrier is reduced. In response to a subsequent change from the desorption phase to the adsorption phase, the same amount of heat transfer medium is returned to the high temperature heat circuit again, which then has the temperature of the high temperature circuit, as already described above, so that the thermal energy, which must be exerted in order to carry out the temperature change in the sorption zone, is recovered again. The cyclically oscillating shift of heat transfer medium mass between the two participating circuits can be buffered by means of suitable equalizing tanks.

A particularly advantageous alternative provides for the adsorption heat pump to be embodied in such a way that the connection between the medium temperature flow pipe and the second flow channel and the connection between the second flow channel and the medium temperature return pipe are open in the desorption phase of the sorption module and for the adsorption heat pump to be embodied in such a way that the connection between the low temperature flow pipe and the second flow channel and the connection between the second flow channel and the low temperature return pipe are open in the adsorption phase of the sorption module. In the desorption phase, in which the working medium is released, the working medium can thus condensate in the phase change zone, because the phase change zone is cooled at least at the medium temperature by means of the medium temperature circuit. The medium temperature circuit can absorb the condensation heat of the working medium. The pressure of the working medium is reduced in the adsorption phase of the sorption module, so that the working medium can evaporate in the phase change zone and can absorb heat from the low temperature circuit at that location. The low temperature circuit in the phase change zone is thus cooled during the adsorption phase, so that the low temperature circuit can be used for cooling. The adsorption phase of the sorption module is thus also referred to as use phase, while the desorption phase of the sorption module is also referred to as regeneration phase.

A favorable option provides for the adsorption heat pump to be embodied in such a way that the connection between the low temperature flow pipe and the second flow channel is partially or completely open and that the connection between the second flow channel to the medium temperature return pipe is partially or completely open at least temporarily in response to a change from the desorption phase to the adsorption phase, wherein one of the two connections is only partially open. The sensible heat, which must be exerted in response to the temperature change of the phase change zone, can be recovered at least partially by means of the cross circuit in the case of the second flow channel. The mechanism corresponds to the mechanism in response to the temperature change of the sorption zone.

A particularly favorable option provides for the adsorption heat pump to be embodied in such a way that the connection between the medium temperature flow pipe and the second flow channel is partially or completely open and the connection between the second flow channel to the low temperature return pipe is partially or completely open at least temporarily in response to the change from the adsorption phase to the desorption phase, wherein at least one of the two connections is only partially open. The required thermal energy can also be partially recovered again by means of this cross circuit in response to heating up the phase change zone. The mechanism corresponds to the mechanism in response to heating up the sorption zone.

The above-mentioned object is further solved by means of a method for operating an adsorption pump according to the above description, wherein the adsorption heat pump is operated discontinuously, wherein the high temperature heat transfer medium flows through the first flow channel in a desorption phase of the sorption module, and the medium temperature heat transfer medium flows through the first flow channel in an adsorption phase of the sorption module, wherein the medium temperature heat transfer medium flows through the first flow channel in a throttled manner in response to a change from the desorption phase to the adsorption phase and is guided into a return pipe for the high temperature heat transfer medium. A majority of the thermal energy, which is stored in the sorption module, in particular in the sorption zone, during the desorption phase, can be recovered in response to a change to a lower temperature during the adsorption phase. The medium temperature heat transfer medium, which cools down the sorption zone, heats to the temperature level of the high temperature circuit, when the flow speed through the first flow channel is sufficiently small. The smaller the flow speed, the steeper a temperature gradient can form in the sorption zone, which shifts from the inlet side of the sorption zone or of the first flow channel to the outlet side of the first flow channel during the cool-down. In particular, the temperature in the outlet area of the first flow channel remains virtually constant until shortly prior to the end of the temperature change to the temperature of the high temperature circuit. The heat, which was stored in the sorption zone of the sorption module, can thus be recovered by returning the heat transfer medium into the high temperature circuit instead of into the medium temperature circuit. The efficiency of the adsorption heat pump can thus be improved by means of this circuitry.

A favorable solution provides for the high temperature heat transfer medium to flow through the first flow channel in a throttled manner in response to a change from the adsorption phase to the desorption phase, and to be guided into a return pipe for the medium temperature heat transfer medium. In response to a change from the adsorption phase to the desorption phase, thus a heating of the sorption zone, heat can also be recovered by means of the cross circuit or the high temperature circuit is not cooled down unnecessarily, respectively, because the cooled-down heat transfer medium is returned into the medium temperature circuit instead of into the high temperature circuit.

A particularly favorable solution provides for the connection between the high temperature flow pipe and the first flow channel and the connection between the first flow channel and the high temperature return pipe to be opened in a desorption phase of the sorption module and for the connection between the medium temperature flow pipe and the first flow channel and the connection between the first flow channel and the medium temperature return pipe to be opened in an adsorption phase of the sorption module, and for the connection between the medium temperature flow pipe and the first flow channel to be partially or completely opened and the connection between the first flow channel to the high temperature return pipe to be partially or completely opened at least temporarily in response to a change from the desorption phase to the adsorption phase, wherein one of the connections is only partially open. In response to a change from the desorption phase to the adsorption phase, the sorption modules are cooled down from the high temperature during the desorption phase to the medium temperature during the adsorption phase. The flow through the first flow channel is throttled by only partially opening the connection, so that the heat transfer medium, which flows through the first flow channel, has at least approximately the temperature of the sorption module when escaping from the sorption module. If the flow speed through the sorption module is sufficiently small, a temperature gradient forms in the sorption module, wherein the temperature of the sorption module is still at the temperature of the high temperature circuit virtually to the complete change of the temperature at the outlet of the first flow channel. The temperature gradient shifts slowly from the inlet side to the outlet side, until the sorption zone has completely adopted the temperature of the medium temperature heat transfer medium. As long as the outlet area of the first flow channel still has the temperature of the high temperature heat transfer medium, the heat transfer medium, which flows through the first flow channel, is heated to the temperature of the high temperature heat source. The medium temperature heat transfer medium, which cools down the sorption module, can thus absorb a very high percentage of the thermal energy from the sorption module. This is returned to the high temperature circuit, so that this heat can be used further. If the heat transfer medium were to be returned to the medium temperature return pipe, the heat would be lost and would need to be released into the environment, which would additionally burden the recooling system. By minimizing this effect, the energy expenditure for carrying out the temperature change in the sorption zone is significantly reduced. This, in turn, increases the efficiency of the adsorption heat pumps.

An advantageous alternative provides for the connection between the high temperature flow pipe and the first flow channel to be partially or completely opened and for the connection between the first flow channel to the medium temperature return pipe to be partially or completely opened in response to a change from the adsorption phase to the desorption phase and for the connection between the first flow channel to the medium temperature return pipe to be partially or completely opened, wherein one of the two connections is only partially opened. According to the change between the desorption phase to the adsorption phase, the required amount of energy, which must be exerted in order to heat the sorption zone, can be reduced in this way. The high temperature heat transfer medium, which is guided in the first flow channel in a throttled manner, in order to heat the sorption zone, adopts the temperature of the sorption zone virtually completely in response to a sufficiently low flow speed. A temperature gradient, which shifts slowly from the inlet side to the outlet side until the sorption zone has completely adopted the temperature of the high temperature heat transfer medium, is created in the sorption zone. As long as the outlet area of the first flow channel still has the temperature of the medium temperature heat transfer medium, the heat transfer medium, which flows through the first flow channel, is cooled down to the temperature of the medium temperature heat sink. No cold heat transfer medium is thus supplied to the high temperature circuit through the cross circuit in response to heating the sorption zone, so that said high temperature circuit does not cool down. It goes without saying that thermal energy is removed from the high temperature circuit, because the volume of the high temperature circuit is reduced in the high temperature circuit. In response to a subsequent change from the desorption phase to the adsorption phase, the same amount of heat transfer medium is returned to the high temperature heat circuit again, which then has the temperature of the high temperature circuit, as already described above, so that the thermal energy, which must be exerted in order to carry out the temperature change in the sorption zone, is recovered again. The cyclically oscillating shift of heat transfer medium mass between the two participating circuits can be buffered by means of suitable equalizing tanks.

A particularly advantageous alternative provides for the connection between the medium temperature flow pipe and the second flow channel and for the connection between the second flow channel and the medium temperature return pipe to be opened in the desorption phase of the sorption module and for the connection between the low temperature flow pipe and the second flow channel and the connection between the second flow channel and the low temperature return pipe to be opened in the adsorption phase of the sorption module. In the desorption phase, in which the working medium is released, the working medium can thus condensate in the phase change zone, because the phase change zone is cooled at least to the medium temperature by means of the medium temperature circuit. The medium temperature circuit can absorb the condensation heat of the working medium. The pressure of the working medium is reduced in the adsorption phase of the sorption module, so that the working medium can evaporate in the phase change zone and can absorb heat from the low temperature circuit at that location. The low temperature circuit in the phase change zone is thus cooled during the adsorption phase, so that the low temperature circuit can be used for cooling. The adsorption phase of the sorption module is thus also referred to as use phase, while the desorption phase of the sorption module is also referred to as regeneration phase.

A favorable option provides for the connection between the low temperature flow pipe and the second flow channel to be partially or completely opened and for the connection between the second flow channel to the medium temperature return pipe to be partially or completely opened at least temporarily in response to a change from the desorption phase to the adsorption phase, wherein one of the two connections is only partially opened. The sensible heat, which must be exerted in response to the temperature change of the phase change zone, can be recovered at least partially by means of the cross circuit in the case of the second flow channel. The mechanism corresponds to the mechanism in response to the temperature change of the sorption zone.

A particularly favorable option provides for the connection between the medium temperature flow pipe and the second flow channel to be partially or completely opened in and for the connection between the second flow channel to the low temperature return pipe to be partially or completely opened at least temporarily in response to the change from the adsorption phase to the desorption phase, wherein at least one of the two connections is only partially opened. The required thermal energy can also be recovered again partially by means of this cross circuit in response to heating the phase change zone. The mechanism corresponds to the mechanism in response to the heating of the sorption zone.

Further important features and advantages of the invention follow from the subclaims, from the drawings and from the corresponding figure description by means of the drawings.

It goes without saying that the above-mentioned features and the features, which will be discussed below, cannot only be used in the respectively specified combination, but also in other combinations or alone, without leaving the scope of the invention at hand.

Preferred exemplary embodiments of the invention are illustrated in the drawings and will be discussed in more detail in the description below, whereby the same reference numerals refer to the same or to similar or to functionally identical components.

BRIEF DESCRIPTION OF THE DRAWINGS

In each case schematically,

FIG. 9a, b show an enlarged illustration of the area A from FIG. 5 for explaining the course of the valve surface;

Figure 1:
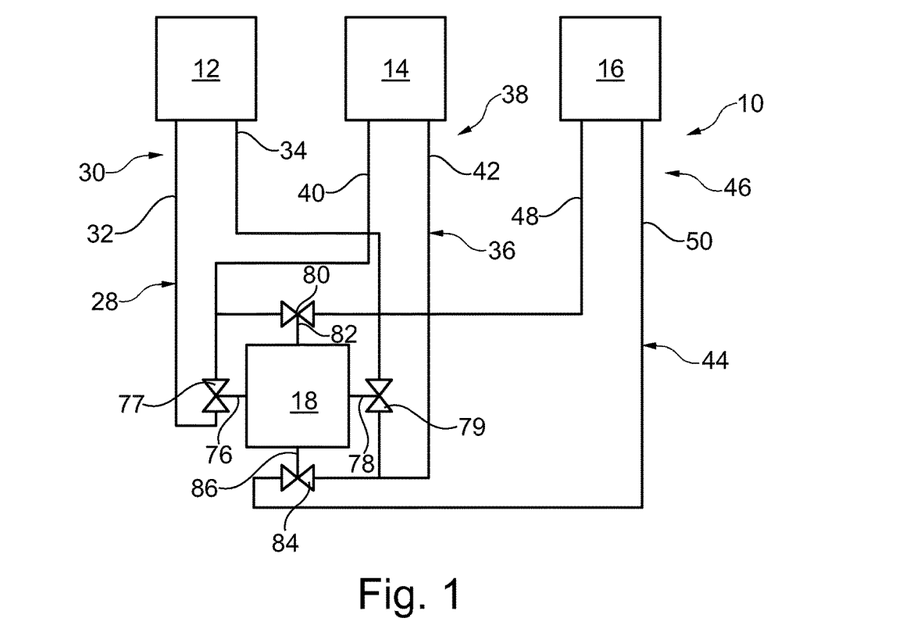
FIG. 1 shows a schematic diagram of an adsorption heat pump.

An adsorption heat pump 10 illustrated in FIG. 1 has a high temperature heat source 12, a medium temperature heat sink 14 and a low temperature heat source 16. The adsorption heat pump 10 further has at least one, for example three, sorption modules 18. The at least one sorption module 18, illustrated in an exemplary manner in FIG. 2, comprises a sorption zone 20, which includes a sorbent 22 and which is alternately heated and cooled. The sorption zone 20 is heated by the high temperature heat source 12 in a desorption phase of the sorption zone 20 and the sorption zone 20 is cooled by the medium temperature heat sink 14 in an adsorption phase. The sorption module 18 furthermore has a phase change zone 24, in which a working medium 26 can condensate and evaporate. The sorption module 18 has a fluid connection 19 between the phase change zone 24 and the sorption zone 20, through which the working medium 26 can reach from the phase change zone 24 to the sorption zone 20 and back.

The high temperature heat source controls the temperature of a high temperature heat transfer medium 28, which circulates in a high temperature circuit 30. The high temperature circuit has a high temperature flow pipe 32, in which the high temperature heat transfer medium 28 is guided to the at least one sorption module 18, and a high temperature return pipe 34, via which the high temperature heat transfer medium 28 is returned to the high temperature heat source 12.

The high temperature heat source 12 has a temperature above the ambient temperature, preferably above 80° C., particularly preferably above 100° C., for example 110° C. The high temperature heat source 12 can represent a waste heat source of any energy conversion or value added processes, or can recover the thermal energy from chemical energy, for example by combustion, or from free-of-charge solar energy.

The medium temperature heat sink 14 cools a medium temperature heat transfer medium 36, which circulates in a medium temperature circuit 38. The medium temperature circuit 38 has a medium temperature flow pipe 40, in which the medium temperature heat transfer medium 36 is guided from the medium temperature heat sink 14 to the sorption module 18. The medium temperature circuit 38 furthermore has a medium temperature return pipe 42, via which the medium temperature heat transfer medium 36 can be guided back from the at least one sorption module 18 to the medium temperature heat sink 14.

The temperature of the medium temperature heat sink 14 corresponds approximately to the ambient temperature. The temperature is in fact slightly larger than the ambient temperature, so that thermal energy can be emitted from the medium temperature circuit 38 into the environment via a heat exchanger. For this purpose, the medium temperature heat sink 14 has a cooler, for example a water or air cooler.

The low temperature heat source 16 controls the temperature of a low temperature heat transfer medium 44, which circulates in a low temperature circuit 46. The low temperature circuit 46 has a low temperature flow pipe 48, in which the low temperature heat transfer medium 44 is guided to the at least one sorption module 18. The low temperature circuit 46 furthermore has a low temperature return pipe 50, in which the low temperature heat transfer medium 44 is guided from the at least one sorption module 18 back to the low temperature source 16.

The temperature of the low temperature heat source 16 is below the ambient temperature and serves to cool, for example motor vehicles, buildings or a refrigerator or the like. When something is cooled by means of the low temperature heat transfer medium 44, the latter is heated up in the low temperature heat source 16, thus the name "source". If a heat pump is used, the low temperature heat source 16 can also be formed by the environment in the form of outside air, geothermal heat or solar heat, the heat of which is absorbed in the case of a low temperature and is emitted via the medium temperature circuit 14 at a higher heating temperature level for heating a room or a building. In this case, the high temperature heat source 12 is generated by means of a combustion process of a chemical energy source, the thermal energy of which is also used to heat at the temperature level of the medium temperature circuit 14.

Figure 2:
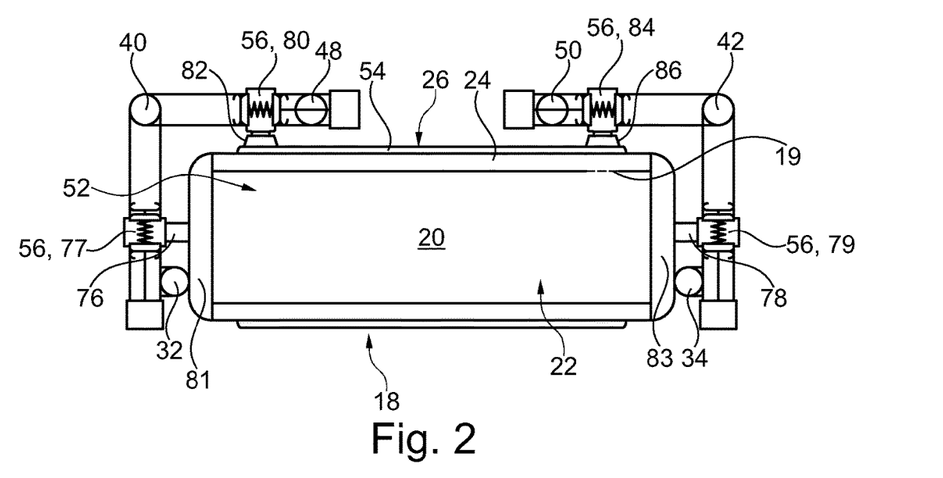
FIG. 2 shows a schematic diagram of a sorption module of the adsorption heat pump.
Figure 3:
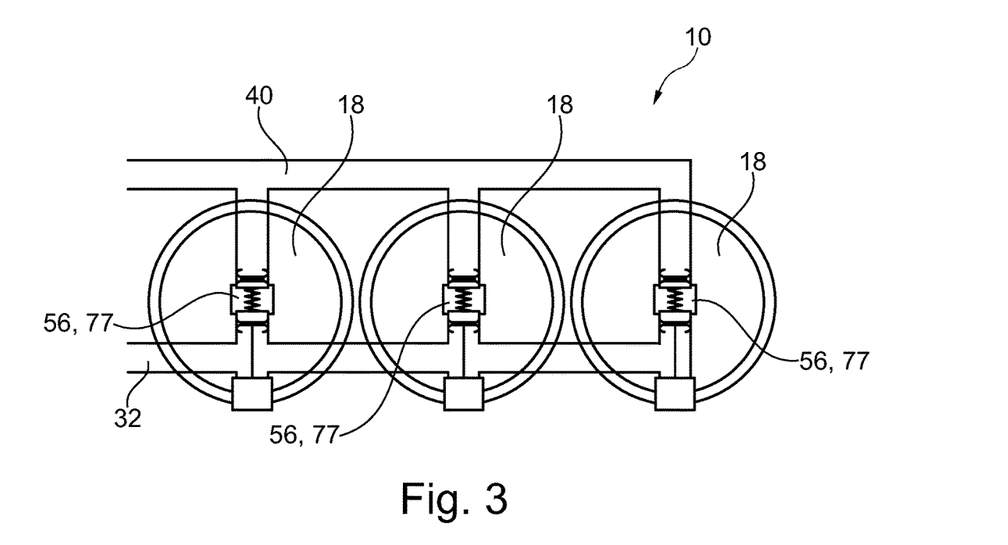
FIG. 3 shows an exemplary arrangement of three sorption modules.

The sorption modules 18 have a first flow channel 52, which is in thermal contact with the sorption zone 20, in particular with the sorbent 22. A heat transfer medium, which flows through the first flow channel 52, can thus control the temperature of the sorbent. The sorption modules 18 furthermore have a second flow channel 54, which is in thermal contact with the phase change zone 24, so that the temperature of the phase change zone 24 can be controlled by means of a heat transfer medium, which flows through the second flow channel 54.

For each sorption module 18, the adsorption heat pump 10 has a plurality of valves 56, for example four, as illustrated in an exemplary manner in FIG. 2, thus a first valve 77, a second valve 79, a third valve 80 and a fourth valve 84. The two flow channels 52, 54 are connected to the circuits 30, 38 and 46 by means of the valves 56.

Figure 5:
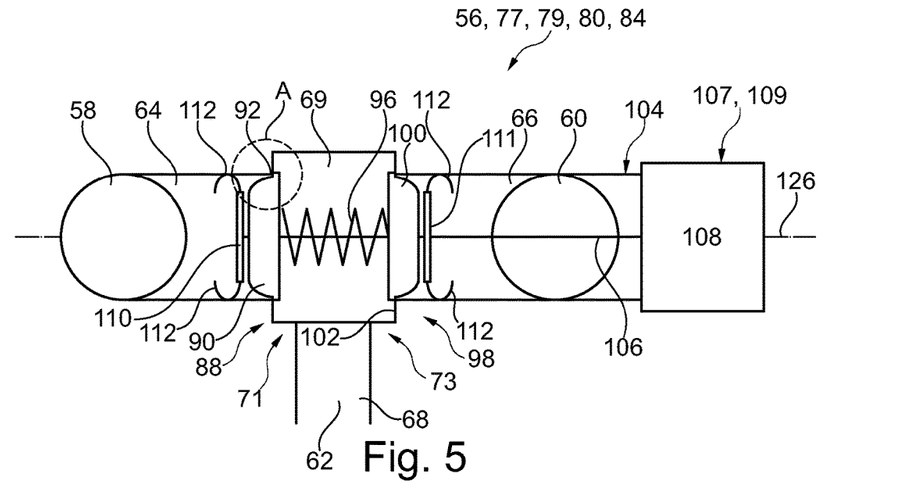
FIG. 5 shows a basic sectional illustration through a valve according to the invention.
Figure 6:
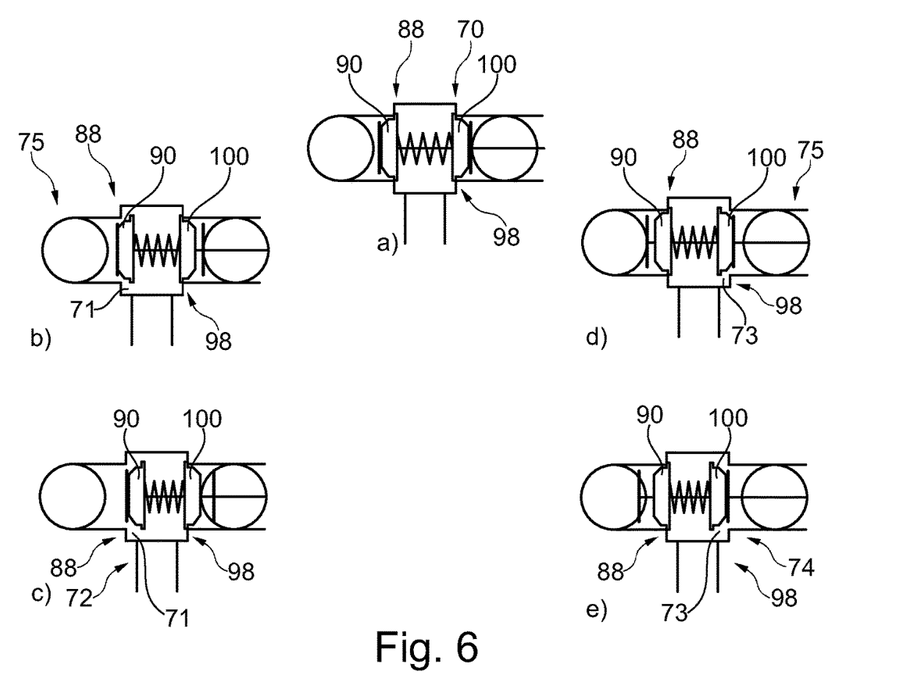
FIGS. 6a-e show different positions, in which a valve according to the invention can be.

As illustrated for example in FIG. 5, the valves 56 in each case have a first port 58, a second port 60 and a third port 62. A first channel 64 extends from the first port 58, a second channel 66 extends from the second port 60, and a third channel 68 extends from the third port 62. The three channels 64, 66 and 68 lead into a central chamber 69, via which a fluid connection is established or can be established between the three channels.

The valves 56 provide for a plurality of switching positions, as they are illustrated in an exemplary manner in FIGS. 6a-e. In a closed position 70, the first channel 64 and the second channel 66 are closed, so that no fluid connection is present between the individual channels. In a first open position 72, the first channel 64 is open and the second channel 66 is closed, so that a first fluid connection 71 is present between the first channel 64 and the third channel 68. In a second open position 74, the second channel 66 is open and the first channel 64 is closed, so that a second fluidic connection 73 is present between the second channel 66 and the third channel 68. The valves 56 furthermore have at least one intermediate position 75, in which the first channel 64 or the second channel 66 is partially opened. A throttled fluid connection is thus present between the first channel 64 and the third channel 68 or between the second channel 66 and the third channel 68.

An inlet 76 of the first flow channel 52 is connected to the high temperature flow pipe 32 and the medium temperature flow pipe 40 via the first valve 77 of the valves 56. The third port 62 is thereby connected to the inlet 76 of the first flow channel 52, so that the third channel 68 of the first valve 77 is fluidically connected to the inlet 76 of the first flow channel 52. The first port 58 is connected to the high temperature flow pipe 32 and the second port 60 is connected to the medium temperature flow pipe 40. The first flow channel 52 of the sorption module 18 can thus be switched between the high temperature flow pipe 32 and the medium temperature flow pipe 40 and a heating phase and a cooling phase can thus be switched.

In the desorption phase, in which the sorbent 22 is to be heated, a fluid connection is established between the inlet of the first flow channel 52 and the high temperature feed pipe 32. In the adsorption phase, the first valve is switched in such a way that a fluid connection is established between the first flow channel 52 and the medium temperature feed pipe 40, so that the sorbent 22 can be cooled by means of the medium temperature heat transfer medium 36.

An outlet 78 of the first flow channel 52 is connected to the high temperature return pipe 34 and the medium temperature return pipe 42 via the second valve 79 of the valves 56. The third port 62 of the second valve 79 is thereby connected to the outlet 78 of the first flow channel 52 and the first port 58 of the second valve 79 is connected to the high temperature return pipe 34, and the second port 60 of the second valve 79 is connected to the medium temperature return pipe 42. This second valve 79 is switched to the high temperature return pipe 34 in the desorption phase and to the medium temperature return pipe 42 in the adsorption phase according to the first valve 77.

For each sorption module 18, the adsorption heat pump 10 furthermore has the third valve 80, which connects an inlet 82 of the second flow channel 54 to the medium temperature flow pipe 40 and the low temperature flow pipe 48. In a condensation phase, in which the working medium 26 condenses in the phase change zone 24, the third valve 80 is switched in such a way that a fluid connection between the second flow channel 54 and the medium temperature flow pipe 40 is present. The phase change zone 24 can thus be cooled by means of the medium temperature heat transfer medium 36. In an evaporation phase, the third valve 80 is switched in such a way that a fluid connection between the second flow channel 54 and the low temperature flow pipe 48 is present. The working medium 26, which evaporates in the phase change zone 24, can thus absorb heat from the low temperature heat transfer medium 44 and can thus cool the latter in the evaporation phase.

For each sorption module, the adsorption heat pump furthermore has the fourth valve 84, which connects an outlet 86 of the second flow channel 54 to the medium temperature return pipe 42 and the low temperature return pipe 50. According to the third valve 80, the fourth valve 84 switches a fluid connection between the second flow channel 54 and the medium temperature return pipe 42 in the condensation phase and a fluid connection between the second flow channel 54 and the low temperature return pipe 50 in the evaporation phase.

During operation of the adsorption heat pump 10, the sorption modules 18 are operated cyclically. The desorption phase and the adsorption phase alternate. In the adsorption phase, the first valve 77 and the second valve 79 are switched in such a way that the sorption zone 20 is cooled by means of the medium temperature heat transfer medium 36. The sorbent 22 can thus adsorb the working medium 26, whereby the pressure inside the sorption module 18 is reduced. The liquid working medium 26, which is localized in the phase change zone 24, can thus evaporate, whereby the working medium 26 can absorb thermal energy. The phase change zone 24 is thus cooled down. By cooling down the phase change zone, thermal energy can be absorbed accordingly from the low temperature heat transfer medium 444, whereby the latter is cooled.

For this purpose, the third valve 80 and the fourth valve 84 are switched in such a way in the evaporation phase that the low temperature heat transfer medium 44 flows through the second flow channel 54 and is thus in thermal contact with the phase change zone 24. The adsorption phase thus takes place substantially simultaneously with the evaporation phase, in which the desired effect, namely the cooling of the low temperature heat transfer medium 44, is reached. This phase is also referred to as use phase.

In a regeneration phase, in contrast, the sorption zone 20 is heated up, so that the desorption phase of the sorption zone 20 is initiated. This is attained in that the first valve 77 and the second valve 79 are switched in such a way that the high temperature heat transfer medium 28 flows through the first flow channel 52 and is thus in thermal contact with the sorbent 22 and can heat up the latter. The sorbent 22 thus emits the working medium 26, so that the pressure in the sorption module 18 rises and the working medium 26 can thus condensate.

In order to condensate the working medium 26 in the phase change zone 24 in the condensation phase, which is initiated through this, the third valve 80 and the fourth valve 84 are switched in such a way that the medium temperature heat transfer medium 36 flows through the second flow channel 54 and is thus in thermal contact with the phase change zone 24 and can cool the latter. It can thus be attained that the working medium 26 condenses in the phase change zone 24 and is ready for evaporation at that location in the use phase.

In response to a change from the regeneration phase to the use phase and vice versa, the sorption zone 20 must be brought from the desorption phase into the adsorption phase or vice versa and the phase change zone 24 must be brought from the condensation phase to the evaporation phase or vice versa. They are in each case characterized by a significant temperature difference, so that significant amounts of heat are diverted into the respective complementary circuit by means of a simple simultaneous switching of the respectively corresponding valves 77 and 79 as well as 80 and 84 between the regeneration phase and the use phase as a result of the sensible heat capacities. In particular high temperature heat is thus lost from the high temperature heat source 12 to the medium temperature heat sink 14 and from the latter to the low temperature heat source 16.

In order to reduce the respective heat losses, so-called cross circuits are adjusted at the transition between the regeneration phase and the use phase and vice versa, in the case of which the first flow channel 52 is for example connected to the high temperature flow pipe 32 on the inlet side and to the medium temperature return pipe 42 on the outlet side. In response to the change between the phases, the unproductive diversion of heat can thus be reduced from a circuit of a higher temperature into a circuit of a lower temperature.

In response to the change from the adsorption phase to the desorption phase, the high temperature heat transfer medium 28 heats up the sorption zone 20. The high temperature heat transfer medium 28 thus cools down. This lost heat must be applied, but does not cause a thermal pumping power. The efficiency is thus reduced.

When the high temperature heat transfer medium 28 flows slowly through the first flow channel 52, the high temperature heat transfer medium cools down approximately to the temperature of the sorption zone 20, namely the temperature of the medium temperature heat transfer medium 36. A temperature gradient 85 is then formed in the sorption zone 20, wherein the temperature can be at the temperature 87 of the high temperature heat transfer medium 28 on the inlet side, and the temperature of the sorption zone 20 is at the temperature 89 of the medium temperature heat transfer medium 36 on the outlet side, as is shown for example in FIG. 4 The temperature gradient 85 shifts from an inlet side 81 of the sorption zone 20 to an outlet side 83 of the sorption zone 20 during the temperature change phase, so that the high temperature heat transfer medium 28, which escapes from the first flow channel 52, has the temperature 89 of the medium temperature heat transfer medium 36 during virtually the entire temperature change phase from adsorption to desorption. It is thus sensible to return the high temperature heat transfer medium 28, which is cooled down in the sorption zone 20, into the medium temperature circuit 38 instead of into the high temperature circuit 30.

Figure 4:
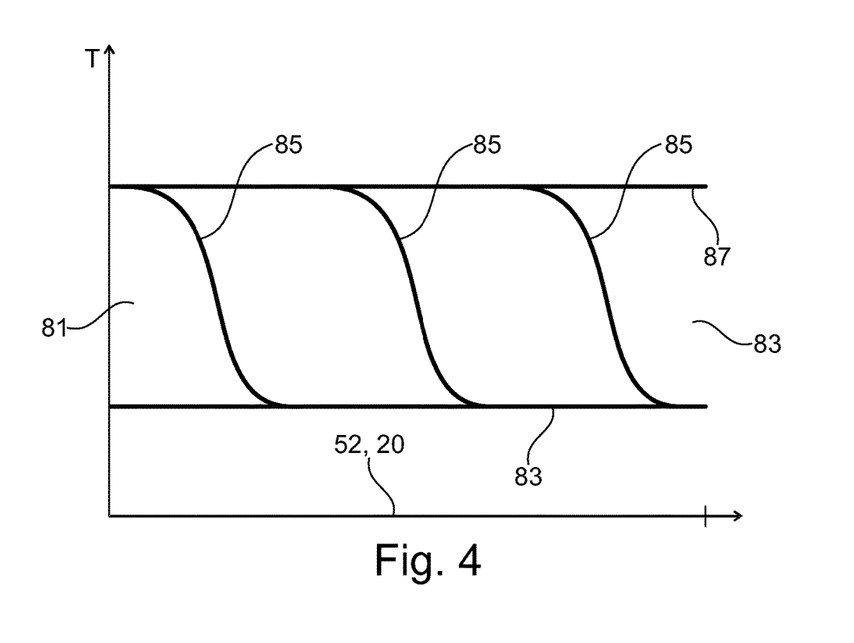
FIG. 4 shows a temperature course in the sorption phase, in the adsorption phase, in the desorption phase and in response to a change from the adsorption phase to the desorption phase.

In response to a change from the desorption phase to the adsorption phase, thus in response to a cool-down of the sorption zone 20, the heat, which is stored in the sorption module 18, can thus be guided back into the high temperature circuit 30 by means of a corresponding cross circuit. The thermal energy, which was removed from the high temperature circuit 30 in response to heating up the sorption zone 20, is returned again in response to cooling down the sorption zone 20. The harmful diversion of heat in response to the temperature changes can thus be reduced.

This effect can be used particularly efficiently, when the heat transfer medium flows through the first flow channel 52 only in a throttled manner during a temperature change phase.

Volume flows from the high temperature circuit 30 to the medium temperature circuit 38 and vice versa are thus shifted back and forth by means of these cross circuits. For example, equalizing tanks can be used for this purpose, which allow for a temporary mass shift between two circuits.

However, the shifts equalize over a cycle. If a plurality of sorption modules is used, the latter are typically furthermore used in a phase-shifted manner, so that the shift of the heat transfer mediums between the circuits also equalizes at any point in time. This is In particular the case, when the cross circuit phases of two modules, which are switched in a complementary manner, take place simultaneously, for the same amount of time and with the same volume flow. In practice, several of these measures can be combined as well.

Heat can also be recovered from the phase change zone 24 in response to the temperature changes by means of a corresponding circuitry of the third valve 80 and fourth valve 84. Due to the fact that the phase change zone 24 is also heated or cooled by means of the phase change of the working medium 26, only a small portion of the heat can be recovered. The higher the heat output through the phase change as compared to the heat output through the heat transfer mediums, the less heat can be recovered. A higher flow speed of the heat transfer mediums would thus be sensible. In the case of a flow speed, which is too high, the heat transfer medium cannot completely adopt the temperature of the phase change zone. A compromise must thus be found, in which the flow speed of the heat transfer medium provides the best result. Finely meterable intermediate positions of the valves 56 are thus advantageous.

The valves 56 have a first valve unit 88, by means of which the first channel 64 can be opened and closed. The first valve unit 88 can thus control a fluid connection between the first channel 64 and the third channel 68, so that a fluid connection between the first port 58 and the third port 62 can thus also be controlled by the first valve unit 88. The first valve unit 88 has a first valve body 90 and a first valve seat 92. When the first valve body 90 is pushed into the first valve seat 92, the first valve body 90 closes the opening formed by the first valve seat 92 and thus closes the first channel 64. If the first valve body 90 is pushed out of the first valve set 92, a ring gap 94 is formed between the first valve body 90 and the first valve seat 92, through which a fluid can flow. The valves 56 in each case have a spring element 96, which applies a closing force to the first valve body 90, which pushes the first valve body 90 into the first valve seat 92.

The valve 56 further has a second valve unit 98 comprising a second valve body 100 and a second valve seat 102. The second valve unit 98 is embodied in such a way according to the first valve unit 88 that it can open and close the second channel 66 of the valves 56. The second valve seat 102 surrounds the flow cross section of the second channel 66. When the second valve body 100 is pushed into the second valve seat 102, the second valve body 100 closes an opening, which is formed by the second valve seat 102, and thus also the second channel 66.

The second valve unit 98 can thus open and close the second channel 66. The second valve unit 98 can thus control a fluid connection between the third channel 68 and the second channel 66. A fluid connection between the second port 60 and the third port 62 is thus controlled by the second valve unit 98.

The spring element 96 of the valves 56 also applies a closing force to the second valve body 100, which pushes the second valve body 100 in the direction of the second valve seta 102.

The spring element 96 is arranged between the first valve body 90 and the second valve body 100, so that the spring element 96 can push the first valve body 90 as well as the second valve body 100 into the respective corresponding valve seat 92, 102, in order to close the respective valve units 88 and 98. The two valve units 88 and 98 are thus arranged so as to be located opposite one another, so that the spring element 96, which is arranged between the first valve body 90 and the second valve body 100, can in each case exert a closing force on the valve bodies. The opening directions of the two valve units 88, 98 thus oppose one another.

The valves 56 in each case have an actuator 104 comprising a control rod 106 and a drive 108, which drives the control rod 106. The control rod 106 engages through the first valve body 90 and the second valve body 100 and is supported in the first valve body 90 and the second valve body 100 so as to glide in axial direction. The actuator 104 further has a first entrainment element 110 and a second entrainment element 111, which are fixedly held on the control rod 106 and are arranged in such a way that the first valve body 90, the spring element 96 and the second valve body 100 are arranged between the two entrainment elements 110, 111.

The entrainment elements 110, 111 have such a radial expansion that, when the control rod 106 is shifted in axial direction, the first valve body 90 is shifted by the first entrainment element 110 or the second valve body 100 is shifted by the second entrainment element 111 out of the respective valve seat 92 or 102 and the first channel 64 or the second channel 66 is thus opened accordingly.

The drive 108 is embodied in such a way that a holding torque of the drive 108 without power is sufficient in order to overcome the closing forces of the spring element 96, so that the actuator 104 can hold the first or the second valve unit 88, 98 in a position, in which the first valve body 90 or the second valve body 100 is pushed out of the respective valve seat 92, 102. The valve 56 can thus remain in an open position, thus in a position, in which either the first channel 64 or the second channel 66 is open, without using energy. This provides for an energy-efficient control of the adsorption heat pump, whereby the efficiency of the adsorption heat pump as a whole is improved.

Intermediate positions, in which the valve bodies 90, 100 are only partially shifted out of the respective valve seat 92, 102, can also be held in the position without power.

The drive 108 has a step motor 107, for example, which has a certain holding torque due to the construction. A holding torque of the actuator 104, which is sufficient to hold the valve units without power in all positions, in particular without current, can thus be attained by selecting a corresponding gear unit 109, in particular the translation of the gear unit 109.

A gear unit, which is self-locking, can further also be selected. The position of the valve units 88, 98 can thus also not be changed by the spring force of the spring element 96 or compressive forces, which act on the valve bodies 90, 100.

The force, which the actuator 104 can exert, is larger than the closing force exerted by the spring element 96, plus a compressive force caused by pressure differences between the third channel 68 and the first channel 64 or the second channel 66.

The actuator 104 further has centering elements 112, which center the control rod 106 and thus also the first valve body 90 and the second valve body 100, so that an exact positioning of the valve bodies 90, 100 on the respective valve seats 92, 102 is possible.

The centering elements 112 can be formed by means of spring tabs for example. These spring tabs are in particular arranged on the entrainment elements 110, 111.

Figure 7:
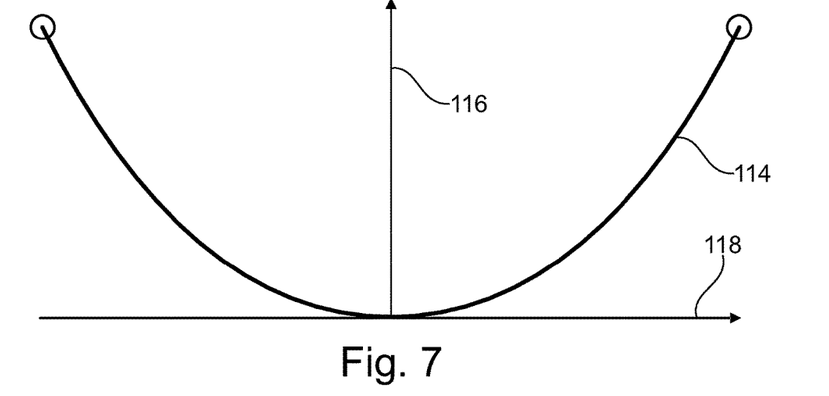
FIG. 7 shows a valve opening characteristic comprising a progressive course.
Figure 8:
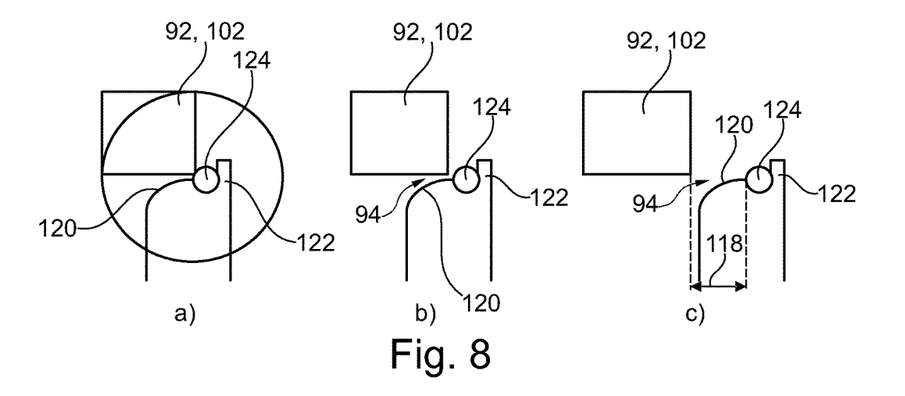
FIGS. 8a-c show an enlarged illustration of the area A from FIG. 5 in the case of three different positions of a valve unit of the valve.

The two valve units 88 and 98 in each case have a valve opening characteristic 114, which defines a flow coefficient 116 of the respective valve unit as a function of a traverse 118. The traverse 118 corresponds to the deflection of the respective valve bodies 90, 100 from the respective valve seat 92, 102. The flow coefficient is specified by the following formula:

$$K_v = Q(\rho/\Delta\rho)^{1/2},$$

wherein Q is the effective flow-effective surface of the respective valve unit, ρ is the density of the fluid and Δρ is the pressure gradient at the valve unit. The effective flow-effective surface thereby considers the flow cross section as well as other flow-influencing geometric properties.

The two valve units 88, 98 and thus the valves 56 preferably have a valve opening characteristic 114, which is not linear. The valve opening characteristic 114 in particular has a varying gradient.

In areas, in which the valve opening characteristic 114 has a small gradient, thus is flat, the flow coefficient 116 only changes slightly when changing the traverse 118, as compared to areas, in which the valve opening characteristic 114 has a larger gradient and is thus steeper.

By selecting the course o the valve opening characteristic 114, areas can thus be attained, in which the flow coefficient 116 can be adjusted particularly accurately. FIG. 7 illustrates a progressive valve opening characteristic 114 for example. In the case of small traverses 118 and thus small flow coefficients 116, the valve opening characteristic 114 is flat, so that the flow coefficient 116 of the valve can thus be adjusted very accurately by means of the actuator 104. This is in particular advantageous in the case of the temperature change phases, in which the flow speed of the respective heat transfer medium is to be small and is to be capable of being adjusted as accurately as possible. In the area of high flow coefficients 116, the valve opening characteristic 114 is steeper. Even though the flow coefficient 116 can thus no longer be adjusted very accurately, the required traverse 118 for completely opening the valve 56 or the respective valve unit 88, 98, respectively, is reduced.

The shape, in particular the course of the valve opening characteristic 114, is provided by the geometry of the valve body and of the valve seats. The course or the shape of a valve surface 120 of the valve bodies 90, 100 is in particular relevant for the course of the valve opening characteristic 114. The valve bodies 90, 100 in each case have a ring 122, by means of which the valve bodies 90, 100 bear against the respective valve seats 92, 102 and thus seal the opening. Provision can possibly be made for a seal 124 in order to improve the sealing effect.

Figure 9:
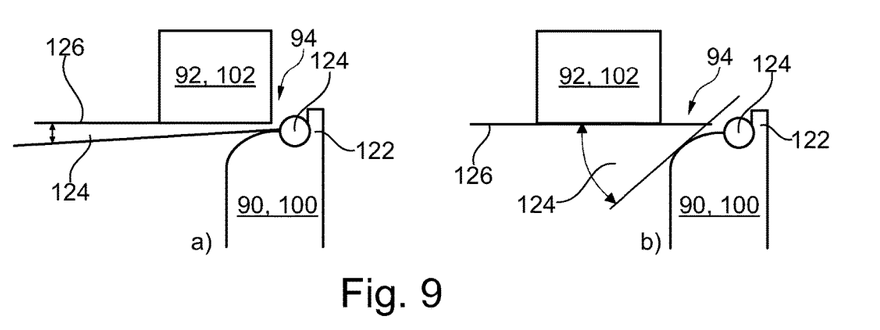

Starting at the ring 122, the valve surface 120 extends axially in closing direction of the respective valve unit and radially inwards. The valve surface 120 can in particular be embodied in a convex manner. The valve surface 120 protrudes into the valve seat 92, 102 in the respective valve unit, when the respective valve body 90, 100 is located in the valve seat. If the valve body 90, 100 is partially lifted out of the valve seat 92, 102, the ring gap 94 is formed. The width of the ring gap is provided by the distance of the valve surface 120 to the respective valve seat 92, 102, in particular by the radial distance.

Due to the fact that the valve surface 120 extends inwards in axial direction as well as in radial direction, the ring gap widens as the traverse 118 of the respective valve bodies 90, 100 increases out of the valve seat 92, 102. The incline of the valve surface 120, thus an angle 127 to a valve axis 126, which substantially corresponds to an axis of the control rod 106, and also determines the direction of the traverse 118 of the two valve bodies 90, 100, determines the gradient of the valve opening characteristic 114. If the angle 127 of the valve surface 120 to the valve axis 126 is large, the gradient of the valve opening characteristic 114 is large. The gradient of the characteristic thereby approximately corresponds to the tangent of the angle 127 of the valve surface 120 to the valve axis 126.

If the valve surface 120 is now curved, for example convex, the valve surface 120 has an angle 127, which varies in axial direction to the valve axis 126. The gradient of the valve opening characteristic 114 thus also varies as a function of the traverse 118. By adapting the valve surface 120, the valve opening characteristic 114 can thus be adjusted.

In the vicinity of the ring 122, the valve surface 120 in particular has a small angle 127 to the valve axis 126. This area is relevant for the valve opening characteristic 114, in the case of small traverses 118 of the respective valve body 90, 100 from the respective valve seat 92, 102. In areas, which have a larger distance to the ring 122, the valve surface 120 has a larger angle 127 to the valve axis 126, so that the gradient of the valve opening characteristic 114 becomes larger in the case of larger traverses 118.

Figure 10:
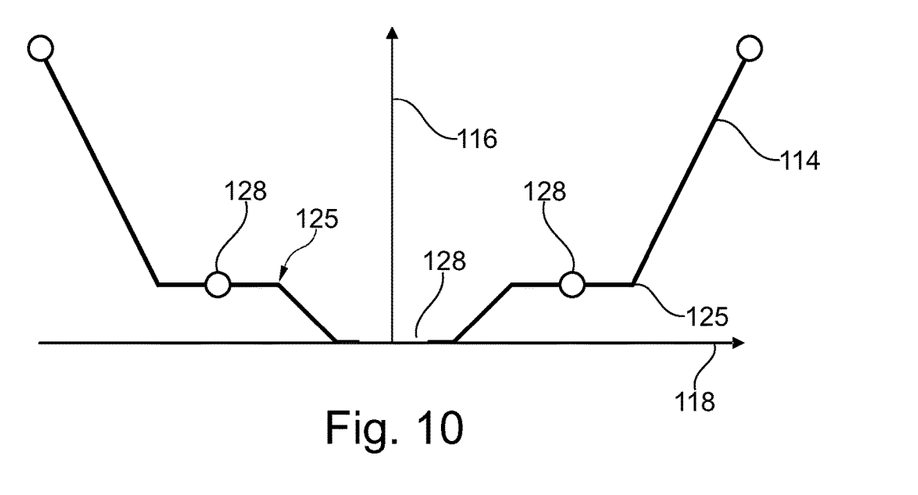
FIG. 10 shows a valve opening characteristic of a valve comprising a step.
Figure 11A:
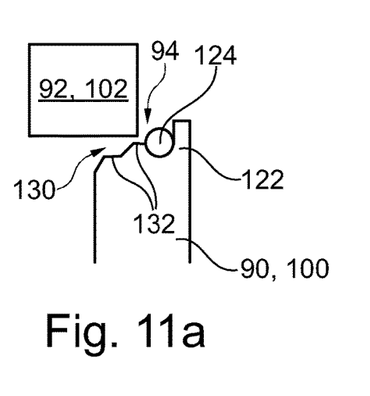
FIG. 11a, b show an enlarged illustration of the area A in the case of a different embodiment of the valve comprising a stepped characteristic, as it is illustrated in FIG. 10.
Figure 11B:
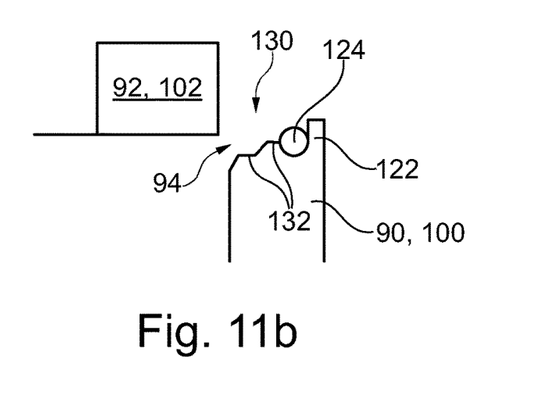

In another alternative of the valves 56, as they are illustrated for example in FIGS. 10, 11a and 11b, the valve opening characteristic 114 has steps 125, in particular a plateau area 128. This can be sensible, for example, when a defined flow coefficient 116, which was known beforehand, is to be adjusted in a reliable manner. The plateau 128 provides for a broad area for the traverse 118, in which the desired flow coefficient 116 of the valve 56 is attained. This can be attained in that the valve bodies 90, 100 have a valve surface 120 comprising steps 130. The valve surfaces 120 in particular have an area 132, in which the angle 127 to the valve axis 126 is very small, in particular is 0°. In the alternative, provision can also be made to adjust a negative angle 127, in order to attain a plateau 128, which is as small as possible.

Otherwise, this alternative corresponds to the above-described alternative.

The invention claimed is:
1. An adsorption heat pump comprising:
a high temperature circuit for a high temperature heat transfer medium including a high temperature flow pipe and a high temperature return pipe;
a medium temperature circuit for a medium temperature heat transfer medium including a medium temperature flow pipe and a medium temperature return pipe;
at least one sorption module in operative communication with the high temperature circuit and the medium temperature circuit, the at least one sorption module including:
a sorption zone;
a phase change zone;
a working medium disposed between the sorption zone and the phase change zone;
a sorbent, wherein the sorbent absorbs and desorbs the working medium;
a first flow channel, wherein the first flow channel is in thermal contact with the sorbent; and
a second flow channel, wherein the second flow channel is in thermal contact with the phase change zone;
at least two valves including a first valve and a second valve in operative communication with the high temperature circuit, the medium temperature circuit, and the at least one sorption module, wherein the at least two valves are at least one of controlled and regulated independently from each other;

wherein the first valve connects the high temperature flow pipe and the medium temperature flow pipe to the first flow channel, and the second valve connects the high temperature return pipe and the medium temperature return pipe to the first flow channel;

wherein the at least two valves include a first port, a second port, and a third port; and wherein a first fluid connection between the first port and the third port and a second fluid connection between the second port and the third port are each selectively opened and closed;

wherein the at least two valves are constructed and arranged to move between a closed position, a first open position, a second open position, and at least one intermediate position;

wherein in the closed position, the first fluid connection and the second fluid connection are closed, and wherein in the first open position the first fluid connection is open and the second fluid connection is closed, and wherein in the second open position the second fluid connection is open and the first fluid connection is closed; and wherein when the at least two valves are in the at least one intermediate position one of the first fluid connection or the second fluid connection is partially open and the other of the first fluid connection or the second fluid connection is closed.

2. The adsorption heat pump according to claim 1, wherein the at least two valves are constructed and arranged to maintain the closed position, the first open position, the second open position, and the at least one intermediate position without a power source.

3. The adsorption heat pump according to claim 1, further comprising a low temperature circuit for a low temperature heat transfer medium, wherein the low temperature circuit includes a low temperature flow pipe and a low temperature return pipe.

4. The adsorption heat pump according to claim 3, wherein the at least two valves further include a third valve and a fourth valve, and wherein:
the first valve, the second valve, the third valve, and the fourth valve are at least one of controlled and regulated independently from each other;
the third valve connects the low temperature flow pipe and the medium temperature flow pipe to the second flow channel; and
the fourth valve connects the low temperature return pipe and the medium temperature return pipe to the second flow channel.

5. The adsorption heat pump according to claim 1, wherein:
a first connection between the high temperature flow pipe and the first flow channel and a second connection between the first flow channel and the high temperature return pipe are open in a desorption phase of the at least one sorption module; and
a third connection between the medium temperature flow pipe and the first flow channel and a fourth connection between the first flow channel and the medium temperature return pipe are open in an adsorption phase of the at least one sorption module;
the third connection is one of partially open or completely open and the second connection is at least partially or completely open in response to a change from the desorption phase to the adsorption phase; and at least one of the third connection and the second connection is only partially open.

6. The adsorption heat pump according to claim 5, wherein the first connection is one of partially open or completely open and the fourth connection is partially or completely open at least temporarily in response to a change from the adsorption phase to the desorption phase, and wherein at least one of the first connection and the fourth connection is only partially open.

7. The adsorption heat pump according to claim 5, wherein:
a fifth connection between the medium temperature flow pipe and the second flow channel and a sixth connection between the second flow channel and the medium temperature return pipe are open in the desorption phase of the at least one sorption module; and
a seventh connection between the low temperature flow pipe and the second flow channel and an eighth connection between the second flow channel and the low temperature return pipe are open in the adsorption phase of the at least one sorption module.

8. The adsorption heat pump according to claim 7, wherein the seventh connection is one of partially open or completely open and the sixth connection is one of partially open or completely open at least temporarily in response to the change from the desorption phase to the adsorption phase, and wherein at least one of the sixth connection and the seventh connection is only partially open.

9. The adsorption heat pump according to claim 7, wherein the fifth connection is one of partially open or completely open and the eighth connection is one of partially open or completely open at least temporarily in response to a change from the adsorption phase to the desorption phase, and wherein at least one of the fifth connection and the eighth connection is only partially open.

10. A method for operating an adsorption heat pump comprising:
providing the adsorption heat pump with a high temperature circuit for a high temperature heat transfer medium including a high temperature flow pipe and a high temperature return pipe, and a medium temperature circuit for a medium temperature heat transfer medium including a medium temperature flow pipe and a medium temperature return pipe, at least one sorption module in operative communication with the high temperature circuit and the medium temperature circuit, the at least one sorption module having a sorption zone, a phase change zone, a working medium between the sorption zone and the phase change zone, a sorbent, a first flow channel in thermal contact with the sorbent, and a second flow channel in thermal contact with the phase change zone, at least two valves including a first valve and a second valve, wherein the first valve connects the high temperature flow pipe and the medium temperature flow pipe to the first flow channel, the second valve connects the high temperature flow pipe and the medium temperature flow pipe to the first flow channel; and
operating the adsorption heat pump discontinuously, wherein the high temperature heat transfer medium flows through the first flow channel in a desorption phase of the at least one sorption module, and the medium temperature heat transfer medium flows through the first flow channel in an adsorption phase of the at least one sorption module; and throttling the medium temperature heat transfer medium through the first flow channel in response to a change from the desorption phase to the adsorption phase into the high temperature return pipe.

11. The method according to claim 10, further comprising throttling the high temperature heat transfer medium through the first flow channel in response to a change from the adsorption phase to the desorption phase, and into the medium temperature return pipe.

12. An adsorption heat pump comprising:
a high temperature heat source, a medium temperature heat sink, and a low temperature heat source;
a high temperature flow pipe in fluid communication with the high temperature heat source;
a medium temperature flow pipe in fluid communication with the medium temperature heat sink;
a low temperature flow pipe in fluid communication with the low temperature heat source;
at least one sorption module having a sorption zone and a phase change zone in fluid communication with the sorption zone, wherein the at least one sorption module further includes a first flow channel in thermal communication with the sorption zone and a second flow channel in thermal communication with the phase change zone;
a first valve in operative communication with the high temperature flow pipe, the medium temperature flow pipe, and the first flow channel;
a second valve in operative communication with the high temperature return pipe, the medium temperature return pipe, and the first flow channel;
a third valve in operative communication with the medium temperature flow pipe, the low temperature flow pipe, and the second flow channel;
a fourth valve in operative communication with the low temperature return pipe, the medium temperature return pipe, and the second flow channel;
a working medium disposed between the sorption zone and the phase change zone;
a sorbent disposed in the sorption zone;
a high temperature heat transfer medium in fluid communication with the high temperature flow pipe, the high temperature return pipe, and the at least one sorption module;
a medium temperature heat transfer medium in fluid communication with the medium temperature flow pipe, the medium temperature return pipe, and the at least one sorption module; and
a low temperature heat transfer medium in fluid communication with the low temperature flow pipe, the low temperature return pipe, and the at least one sorption module.

13. The adsorption heat pump according to claim 12, wherein:
the first valve, the second valve, the third valve, and the fourth valve each include a first port, a second port, and a third port; and
a first fluid connection between the first port and the third port and a second fluid connection between the second port and the third port are each selectively controlled.

14. The adsorption heat pump according to claim 13, wherein the first valve, the second valve, the third valve, and the fourth valve are constructed and arranged to move between a closed position, a first open position, a second open position, and at least one intermediate position;
wherein in the closed position, the first fluid connection and the second fluid connection are closed;
wherein in the first open position, the first fluid connection is open and the second fluid connection is closed;
wherein in the second open position, the second fluid connection is open and the first fluid connection is closed; and
wherein in the at least one intermediate position, one of the first fluid connection or the second fluid connection is partially open and the other of the first fluid connection and the second fluid connection is closed.

15. The adsorption heat pump according to claim 14, wherein the first valve, the second valve, the third valve, and the fourth valve are constructed and arranged to maintain the closed position, the first open position, the second open position, and the at least one intermediate position without a power source.

16. The adsorption heat pump according to claim 12, wherein:
a first connection between the high temperature flow pipe and the first flow channel and a second connection between the first flow channel and the high temperature return pipe are open in a desorption phase of the at least one sorption module;
a third connection between the medium temperature flow pipe and the first flow channel and a fourth connection between the first flow channel and the medium temperature return pipe are open in an adsorption phase of the at least one sorption module;
the third connection is one of partially open or completely open, and the second connection is one of partially open or completely open, at least temporarily, in response to a change from the desorption phase to the adsorption phase; and
at least one of the third connection and the second connection is only partially open.

17. The adsorption heat pump according to claim 16, wherein the first connection is one of partially open or completely open and the fourth connection is one of partially open or completely open at least temporarily in response to a change from the adsorption phase to the desorption phase, and wherein at least one of the first connection and the fourth connection is only partially open.

18. The adsorption heat pump according to claim 16, wherein:
a fifth connection between the medium temperature flow pipe and the second flow channel and a sixth connection between the second flow channel and the medium temperature return pipe are open in the desorption phase of the sorption module; and
a seventh connection between the low temperature flow pipe and the second flow channel and an eighth connection between the second flow channel and the low temperature return pipe are open in the adsorption phase of the sorption module.

19. The adsorption heat pump according to claim 18, wherein the seventh connection is at least partially open and the sixth connection is one of partially open or completely open at least temporarily in response to a change from the desorption phase to the adsorption phase, and wherein at least one of the sixth connection or the seventh connection is only partially open.

20. The adsorption heat pump according to claim 18, wherein the fifth connection is one of partially open or completely open and the eighth connection is one of partially open or completely open at least temporarily in response to the change from the adsorption phase to the desorption phase, and wherein at least one of the fifth connection or the eighth connection is only partially open.

\* \* \* \* \*